(12) United States Patent
Fachinger et al.

(10) Patent No.: US 7,650,209 B2
(45) Date of Patent: Jan. 19, 2010

(54) METHOD FOR MONITORING THE FUNCTIONS AND INCREASING THE OPERATIONAL RELIABILITY OF A SAFETY-RELEVANT CONTROL SYSTEM

(75) Inventors: Georg Fachinger, Limburg (DE); Reinhold Kascha, Altenstadt (DE)

(73) Assignee: Continental Teves AG & CO. oHG, Frankfurt (DE)

( * ) Notice: Subject to any disclaimer, the term of this patent is extended or adjusted under 35 U.S.C. 154(b) by 786 days.

(21) Appl. No.: 10/517,949

(22) PCT Filed: Jun. 27, 2003

(86) PCT No.: PCT/EP03/06819

§ 371 (c)(1),
(2), (4) Date: Aug. 23, 2005

(87) PCT Pub. No.: WO2004/005090

PCT Pub. Date: Jan. 15, 2004

(65) Prior Publication Data

US 2006/0156073 A1    Jul. 13, 2006

(30) Foreign Application Priority Data

Jul. 5, 2002    (DE) .................................. 102 30 577

(51) Int. Cl.
*G06F 7/00* (2006.01)

(52) U.S. Cl. ......................................... 701/29; 702/185

(58) Field of Classification Search .................... 701/29, 701/35; 702/182–185; 714/47–48
See application file for complete search history.

(56) References Cited

U.S. PATENT DOCUMENTS

| 5,119,300 | A | 6/1992 | Bartke et al. | |
| 6,374,374 | B1 * | 4/2002 | Heinrich | ..................... 714/709 |
| 7,103,460 | B1 * | 9/2006 | Breed | ......................... 701/29 |

FOREIGN PATENT DOCUMENTS

| DE | 4439060 | 5/1996 |
| DE | 19607429 | 9/1997 |
| DE | 19753907 | 6/1999 |
| WO | 03039929 | 5/2003 |

* cited by examiner

*Primary Examiner*—Yonel Beaulieu

(57) ABSTRACT

A method for monitors the functions and increases the operational reliability of a complex safety-relevant control system. Examples of such control systems include motor vehicle control systems such as a brake system (ABS, TCS, ESP, EHB, EMB), a steering aid ("steering-by-wire"), etc. The method also detects and evaluates system errors. The method detects a system error and evaluates as a group error, brings about a complete system degradation or a partial system degradation corresponding to the group error, e.g. limitation of the system functions and the system availability, localizes the system error and the error source by tests, logical combining of the test results, plausibility considerations, etc. and gradually cancels the restrictions of the system functions and enhances the system availability in dependence on the result of the individual steps for bounding or localizing the system error and the error source.

1 Claim, 1 Drawing Sheet

METHOD FOR MONITORING THE FUNCTIONS AND INCREASING THE OPERATIONAL RELIABILITY OF A SAFETY-RELEVANT CONTROL SYSTEM

BACKGROUND OF THE INVENTION

The present invention relates to a method and a system with means for monitoring the functions and increasing the operational reliability of a complex safety-relevant control system, e.g. a motor vehicle control system, such as ABS, TCS, ESP, a 'brake-by-wire' system (EHB, EMB), a 'steering-by-wire' system, etc., and for detecting and evaluating system errors.

Safety-relevant systems among which are the above-mentioned motor vehicle control systems require measures to secure a defined mode of operation also in case system errors are detected. It is often not possible to allocate a detected error in the normal operation directly to a system component. Errors of this type, also referred to as group errors, mostly include only the information that a defined physical quantity in the system could not be maintained. Only the execution of special tests, also referred to as error localization, permits identifying the erroneous system component (that means converting the group error into an individual error) and bringing about the suitable effect on the error (by an appropriate system degradation).

Before error localization can be successfully completed (in some cases this event is delayed or error localization is not possible because e.g. undervoltage prevails or because an earlier error precludes using the system components which are necessary for performing tests), the system is in an undefined condition: it has taken note of an error condition but is not able to bring about the suitable effects on the system.

The solution of this problem is nowadays searched for in various error analysis methods, which furnish as a result of the first error consideration a decision matrix ('error->system effect') by means of which the effects of the errors on the functions of the system can be detected. In this respect, group errors are among the especially difficult cases of analysis because they can be due to errors of many system components simultaneously. It is often impossible for this reason to evaluate the effects of a group error and to find a satisfactory global system degradation stage for the group error. The other disadvantage of this approach consists in that the transition from the global to the individual error effect is possible only after a successful completion of the error localization. When localization is delayed due to temporary events or even prevented due to errors that occurred earlier, continuous duty of the global and mostly serious comprehensive system degradation will start. This will in turn have adverse effects on system availability and system safety.

SUMMARY OF THE INVENTION

In view of the above, an object of the invention is to develop a method, which maintains the control system in each phase in a defined condition when system errors occur, on the one hand, and minimizes the effects of the system error on the control, on the other hand.

It has shown that his object can be achieved by the method mentioned in the attached patent claim, said method essentially basing on the following steps:

detecting a system error and evaluation as a group error, bringing about a complete system degradation or a partial system degradation corresponding to the group error, e.g. limitation of the system functions and the system availability, localizing the system error and the error source by tests, logical combining of the test results, plausibility considerations, etc. and gradually canceling the restrictions of the system functions and enhancing the system availability in dependence on the result of the individual steps for bounding or localizing the system error and the error source.

This means the method of the invention safeguards maintaining the defined function of the system upon the occurrence of errors already before the error is identified, and minimizing the effects of the error is taken care of immediately thereafter in the course of error localization.

Further features, advantages and details of the invention can be taken from the following description and the accompanying drawing.

DETAILED DESCRIPTION OF THE DRAWINGS

Figure 1:
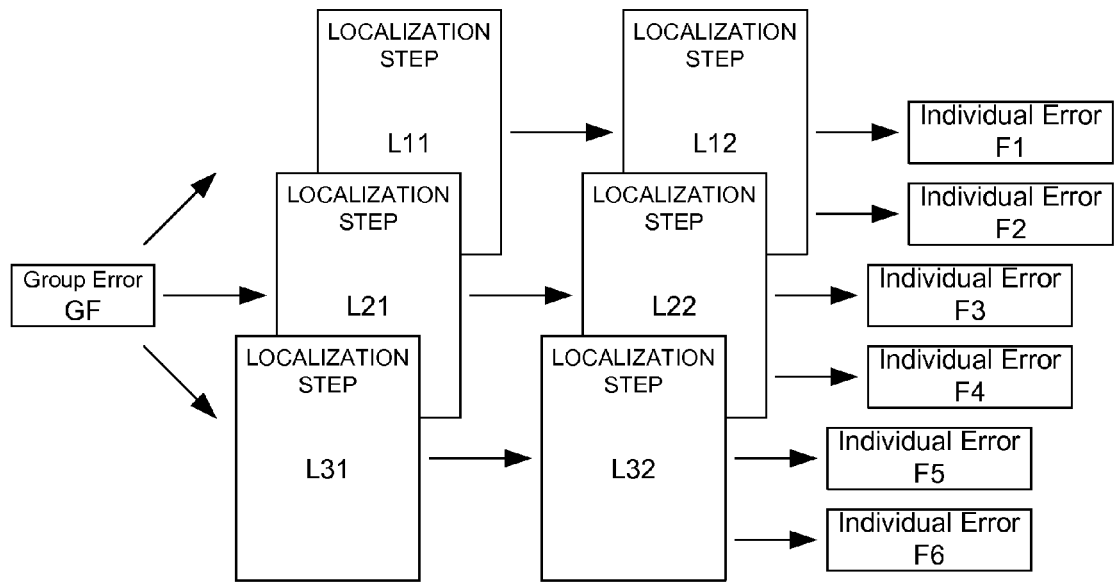
FIG. 1 is a schematically simplified and exemplary view of the individual steps upon the occurrence of a group error until localization of the individual error.
Figure 2:
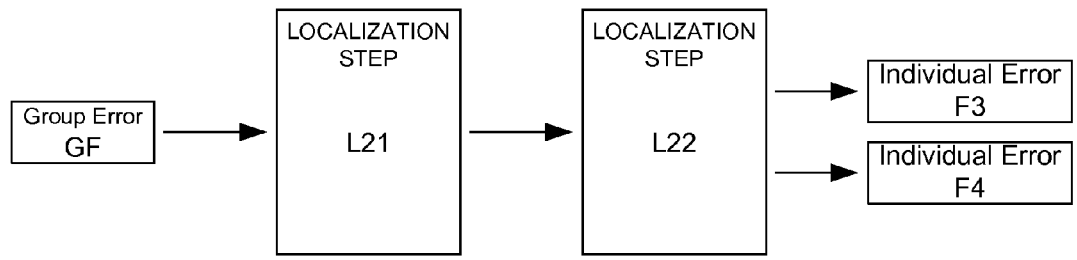
FIG. 2 and FIG. 3 show special localization steps for the embodiment of FIG. 1 in the same way of illustration as FIG. 1.
Figure 3:
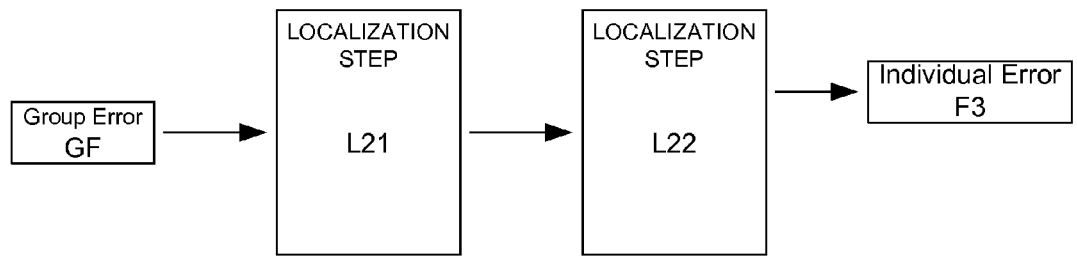

FIGS. 1-3 illustrate the principal mode of operation and effect of the method of the invention by way of a simplified illustrated embodiment of the invention.

According to the invention, the effects of a group error GF, see FIG. 1, is initially equated with a superposition of the effects of all individual errors F1 to F6. Therefore, the overall system is initially degraded when the group error GF occurs. The system degradation is calculated as a superposition of the effects of the individual errors F1-F6. Subsequently, the system degradation, i.e. the limitation of the system functions and the system availability as a result of the group error GF, is cancelled again in dependence on the progress of the localization of the individual error F1 to F6.

The group error GF initiates three parallel localizations L11, L21 and L31 in the embodiment according to FIG. 1. In the next step each of these localizations can cause two individual errors F1, F2; F3, F4; F5, F6, respectively. Before the first localization step (L11, L21, L31) is completed, the system degradation is determined as a superposition of the effects of the individual errors F1-F6.

The first localization step (L11, L21, L31) in the example of FIG. 2 leads to the result that an error can prevail in the range of the localization L21 only. Localizations L11 and L31 are not conspicuous. The individual error sources F1, F2 and F5, F6 are ruled out. The restrictions of the system function and the system availability initiated prior to this first localization step can be reduced corresponding to the discovery that only F3, F4 are possible as error sources. After completion of the second localization step, the system degradation is calculated as a superposition of the effects of the individual errors F3 and F4.

Localization is continued. FIG. 3 refers to this fact. Upon completion of this second localization step it is established in the example according to FIG. 3 that only one individual error F3 exists in the system. The system degradation results directly from the effect of the individual error F3.

The system error is bound or the error source is localized on the basis of known methods and conclusions of very different types, e.g. by means of tests, logical combining of the test results, plausibility considerations, etc.

This means that the object of the invention is a method appropriate for use in technical applications of different type, which renders it possible to dynamically minimize the system degradation of any optional safety-critical system during localization actions being carried out due to group errors that occurred. This method, which is applicable in every technical field, considerably enhances system availability and eventually safeguards a significantly greater extent of system safety than the currently customary methods do which are based on the scarcely definable global effect of the group errors.

It is achieved by the stepwise error localization that the initial system degradation due to a group error is minimized constantly and smoothly until the level of the detected individual error is reached. When localization is delayed due to temporary events or even discontinued due to former errors, the system degradation is limited to the effects of the individual errors being not (yet) ruled out.

In contrast to the previous methods, the method of the invention provides among others the following advantages:

The effect of a group error automatically results from the sum of the easily definable effects for correlated individual errors. An error analysis for group errors is eliminated.

The effects of a group error are diminished as the localizations proceed. Availability and safety of the system is increased dynamically to a major degree.

The case that a group error could not be localized until the end does not need special treatment.

The invention claimed is:

1. A method for monitoring the functions and increasing the operational reliability of a complex safety-relevant vehicle control system, and for detecting and evaluating system errors, the method comprising the steps of:

detecting a system error and evaluation as a group error,
 bringing about a system degradation corresponding to the group error by restricting system functions,
 localizing the system error and an error source by at least one of the functions out of the group consisting of tests, logical combining of the test results and plausibility considerations, and
 gradually canceling the restrictions of the system functions and enhancing the system availability in dependence on the result of the step for localizing the system error and the error source.

* * * * *